United States Patent [19]

Pinder

[11] Patent Number: 5,768,834
[45] Date of Patent: Jun. 23, 1998

[54] RAIN SHIELD

[76] Inventor: Robert C. Pinder, R.R. 21, Cambridge, Ont., Canada, N3C 2V3

[21] Appl. No.: 703,689

[22] Filed: Aug. 27, 1996

Related U.S. Application Data

[63] Continuation of Ser. No. 521,883, Aug. 31, 1995, abandoned.

[51] Int. Cl.$^6$ .................................................. E06B 3/26
[52] U.S. Cl. .............................. 52/202; 52/72; 52/203; 114/211; 296/219
[58] Field of Search .......................... 52/58, 199, 202, 52/219, 66, 72, 200, 203; 114/201 R, 202, 211; 206/215, 216, 219, 221, 222, 224

[56] References Cited

U.S. PATENT DOCUMENTS

| | | | |
|---|---|---|---|
| 1,539,534 | 5/1925 | Ansell . | |
| 2,173,890 | 9/1939 | Tuttle | 52/72 |
| 3,045,631 | 7/1962 | Stransky | 114/201 R |
| 3,077,225 | 2/1963 | Aarvold | 114/202 X |
| 4,186,523 | 2/1980 | Palmaer | 52/72 X |
| 4,428,358 | 1/1984 | Adamson | 52/200 X |
| 4,592,269 | 6/1986 | Lamparter | 98/2.14 |
| 5,022,339 | 6/1991 | Baskin | 114/211 |
| 5,031,959 | 7/1991 | Queveau | 296/216 X |
| 5,054,846 | 10/1991 | Simin et al. | 296/219 X |
| 5,081,912 | 1/1992 | Clenet | 114/212 X |
| 5,299,791 | 4/1994 | Schlapp | 296/216 X |

OTHER PUBLICATIONS

Maxxair Vent Corp., Installation Instructions, Undated.

*Primary Examiner*—Carl D. Friedman
*Assistant Examiner*—Timothy B. Kang
*Attorney, Agent, or Firm*—Cushman Darby & Cushman IP Group of Pillsbury Madison & Sutro LLP

[57] ABSTRACT

A rain deflector for a vehicle roof vent consists of a pair of like panels one of which is fastened to the cap of the roof vent and moves therewith, and is hinged to the second panel which has the end remote from the hinge connected to slide along tracks on the vehicle roof. Each panel is substantially larger than the vent cap, to extend beyond the edges of the vent and prevents rain from entering the vent while permitting ventilation of air through the vent.

8 Claims, 6 Drawing Sheets

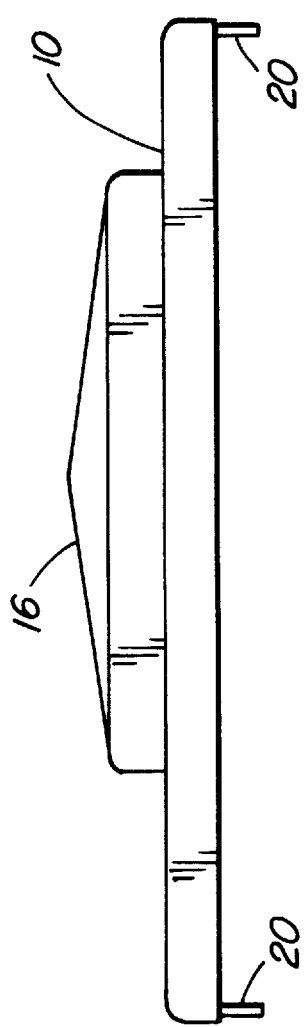
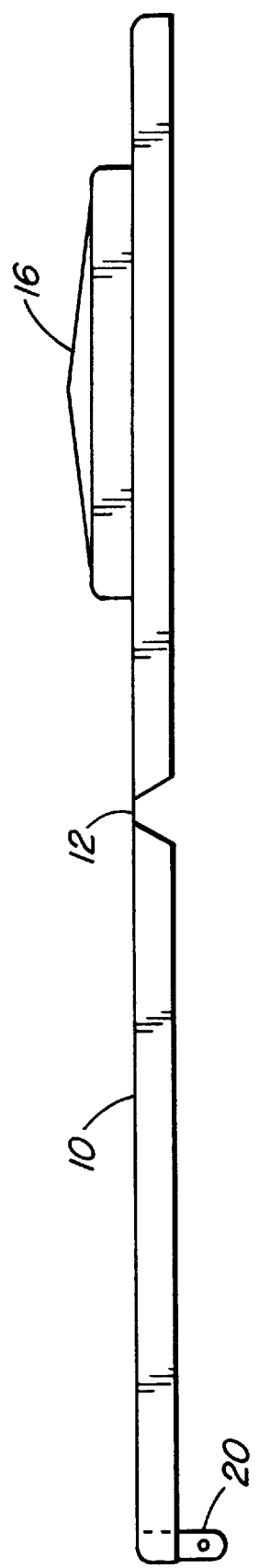

RAIN SHIELD

This is a continuation of application Ser. No. 08/521,883, filed on Aug. 31, 1995, which was abandoned upon the filing hereof.

The present invention relates to a device which, when installed over a standard vehicle ventilation hatch to allows a full flow of warm air out of the vehicle through the hatch, and also keeps rain from entering the vehicle through the hatch.

The standard roof vent used by most recreation vehicles in North America has a fourteen inch square opening through the roof, over which an adjustable hatch vent is installed. This unit has a crank-up mechanism attached to a hinged cap, which when closed, keeps out the rain, but when raised to full height rotates upward at approximately a fifty to sixty degree angle to the horizontal, allowing full ventilation. Unfortunately, when open, the vent cannot prevent rain from entering the vehicle that it is installed upon.

BACKGROUND OF THE INVENTION

There are known units for moving vehicles, buses and cars using openings in the roof and covered by a fixed lid mounted over openings which vent out the back of the lid. Another type is a dome mounted permanently over the roof vent with a small screened and louvered area on one vertical side. Reference is made to U.S. Pat. No. 4,592,269 dated Jun. 30, 1986 to Lamparter and U.S. Pat. No. 1,539,534 dated May 1925 to Ansell, which show examples of such prior art devices. Although these units keep rain out of a vehicle, the volume of air exhausted is very small when the vehicle is stationary. These units need forward motion to provide adequate ventilation.

There has been a need for rain protection plus full ventilation for as long as these types of roof vents have been used. Also, a survey of registered recreation vehicles shows over twenty-six million units in North America. Accordingly, there is a well defined demand for the device of the present invention.

SUMMARY OF THE INVENTION

The object of the roof vent rain deflector of the invention, when mounted on to the lid of a ventilating roof hatch, is to keep rain out of the roof vent lid at any angle of travel. Also, it allows unrestricted flow of hot air from inside the structure without the aid of any power unit. The roof vent can be left open during vehicle movement at a lower setting for ventilation.

Further advantages are a splash stopping mat fastened to the roof on each side of the roof vent opening, stopping the splashing or bouncing of raindrops being driven from the side by strong winds. Also, it has a low profile during vehicle movement.

The invention comprises two rectangular lids with a flexible hinge between them. These lids are moulded to fit over the roof vent cap and are approximately double the width of said cap.

The right end lid is mounted onto the roof vent cap and the left lid is secured to the roof of the structure by rollers inside a track or slide, allowing the outer end to move forward, forming a triangle cover over the roof vent opening when it is cranked up, shielding it from rain and allowing full ventilation.

An added feature is a splash stopping mat mounted onto each side of the roof opening the length of the opening and extending to beyond the width of the front lid, thereby stopping the bouncing or splashing of raindrops from wind driven rain.

Greater rain protection is achieved by lowering the roof vent lid some, which still allows air movement because the triangle is widening at the bottom, thereby giving the same area for air movement.

The largest use of the roof vent rain deflector provided in accordance with the invention would be for recreation vehicles, but it could also be easily adapted to marine and ventilating skylight use.

BRIEF DESCRIPTION OF THE DRAWINGS

In the accompanying drawings,

FIG. 2 is an end view of the deflector shown in FIG. 1 showing two support legs which are used to support the sliding end section of the deflector;

FIG. 3 is a side view of the deflector shown in FIG. 1 showing a rear support leg, hinged centre area and a domed section shaped to fit over and embrace a vent roof cap.

DETAILED DESCRIPTION OF THE INVENTION

Figure 1:
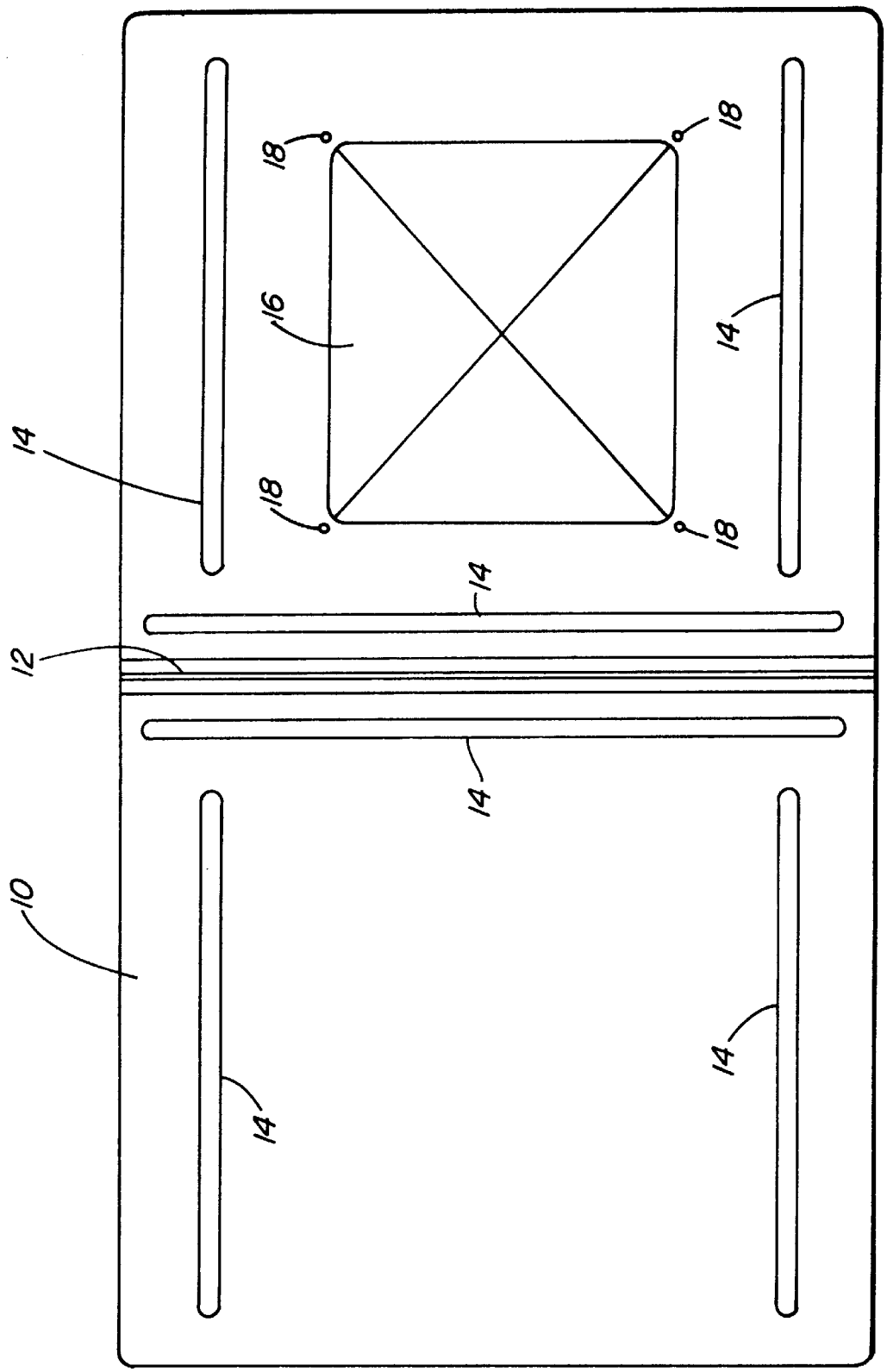
FIG. 1 is a top view of the roof vent rain deflector of the invention.

Referring to FIG. 1 there is shown a plastic one-piece lid 10, having a flexible integral hinge 12, and reinforcing ribs 14. One end of the lid 10 has a domed section 16 and is provided with four mounting holes 18 for attachment to the cap of a roof vent.

FIG. 2 is an end elevation of the lid 10 of FIG. 1 showing support legs 20 extending below the lid 10. In FIG. 3 the lid 10 is shown in side view, clearly showing the relationship of the domed section 16, the flexible hinge 12 and the support legs 20.

Figure 4:
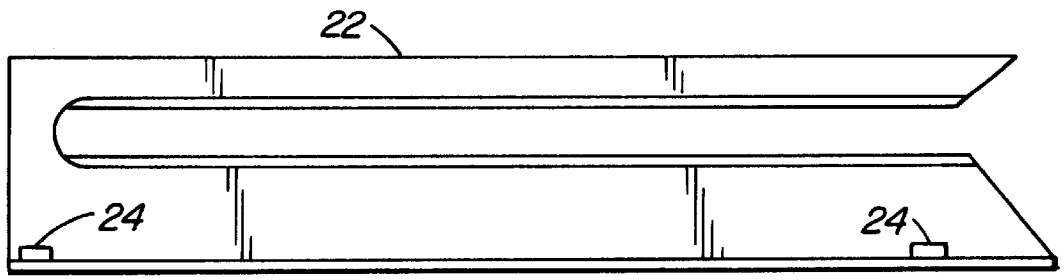
FIG. 4 is a side view of the slide track showing the slotted area and mounting fasteners to mount the deflector to the roof of a vehicle.
Figure 5:
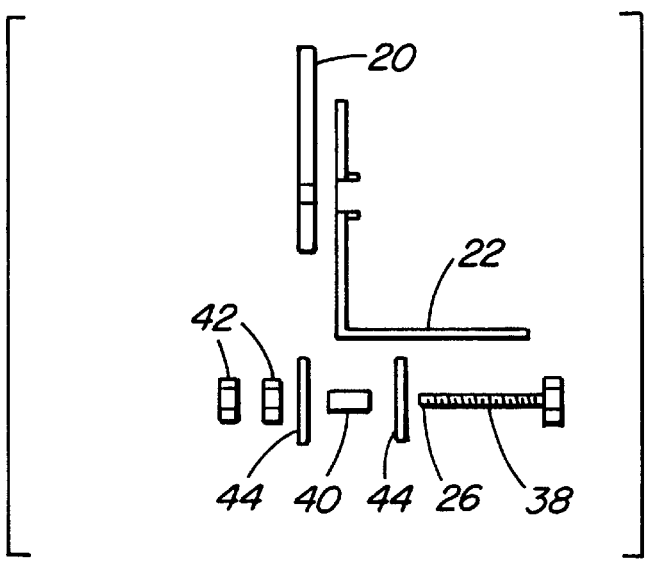
FIG. 5 is an exploded view of a support leg, the end of a slide track and sliding axle assembly.
Figure 6:
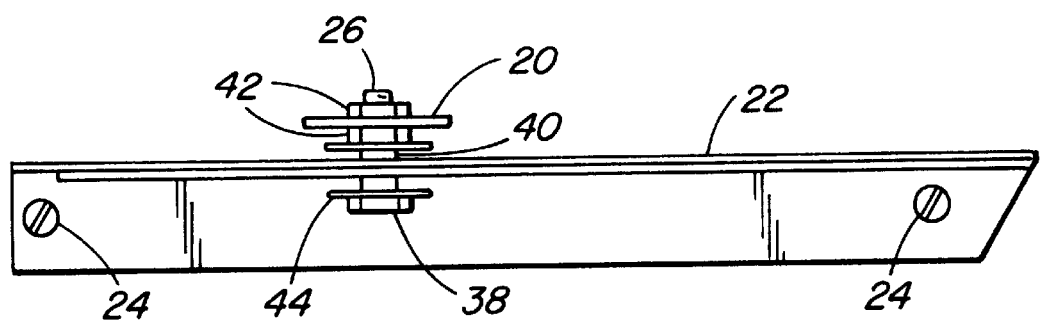
FIG. 6 is a top view of the slide track of FIG. 5 with the sliding axle assembly engaged in the track.

FIGS. 4, 5, and 6 illustrate a slide track 22, fasteners 24 used to mount the slide track 22 to the roof of the vehicle, and the sliding axle assembly 26 used to connect the support legs 20 (FIG. 2) to the slide tracks 22 of the device. The sliding axle assembly 26 consists of a bolt 38, a sleeve 40, nuts 42 and washers 44. It will be appreciated by those skilled in the art that two slide tracks 22 and two sliding axle assemblies 26 are required for each lid 10, the tracks 22 being mirror images of each other and mounted on the vehicle roof on opposite sides of the roof vent frame, as explained hereinafter.

Figure 7:
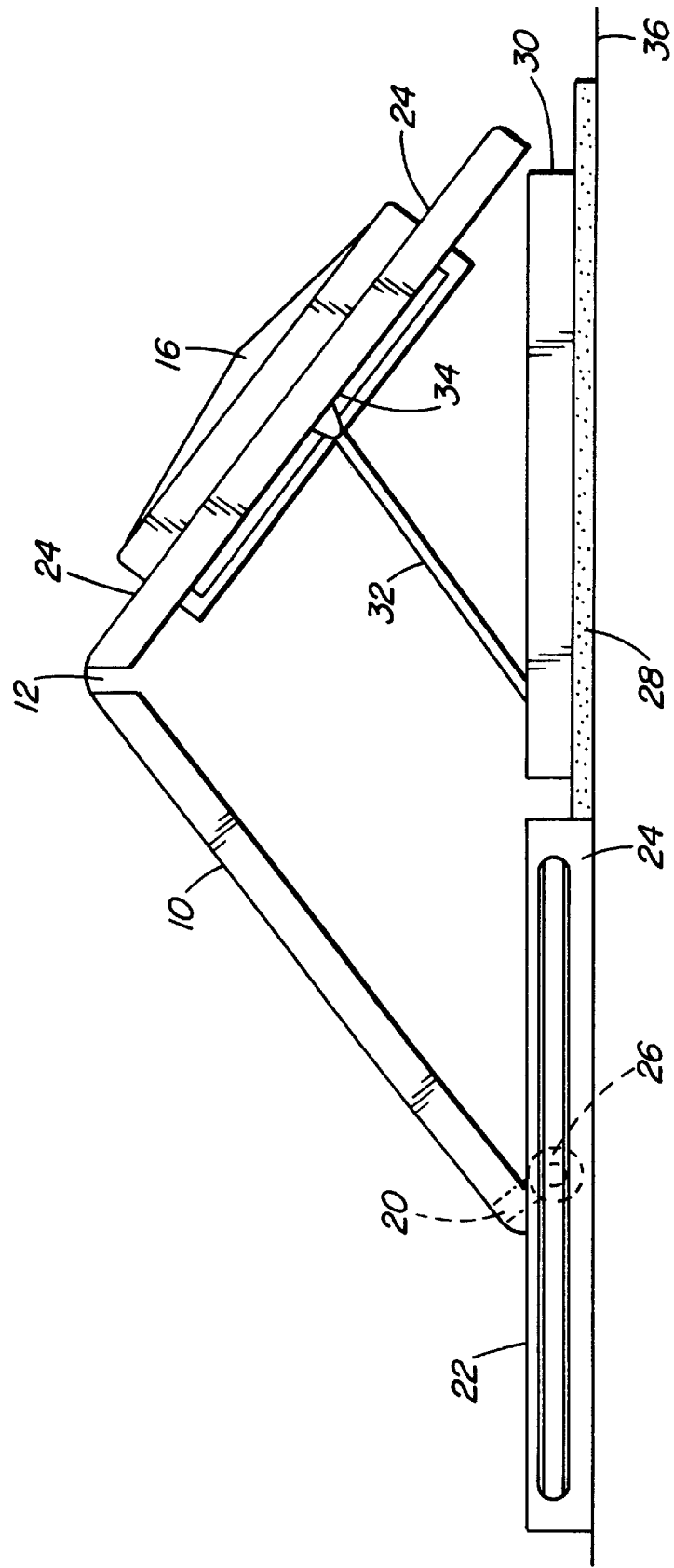
FIG. 7 is a side view of the deflector of FIG. 1 installed on a vehicle roof.

FIG. 7, which is a side view of the deflector mounted on the roof of a vehicle 36, with the roof vent hatch assembly in a partly open position, illustrates the operation of the deflector of the present invention. In the open position, the lid 10 is urged upward by the roof vent cap 34 and folds along flexible hinge 12 with domed section 16 nesting with the vent cap 34. Sliding axle assemblies 26 slide along slide tracks 22, permitting full flow of exhaust air through the vent opening, while covering the vent opening to prevent rain from entering the vent. Vent frame 30 defines the area of the opening over which the cap spans when the vent is in the closed position. Arm 32 is a component of the roof vent mechanism, which controls the position of the cap 34, and does not form part of the device of the present invention. A splash arresting mat 28 is positioned on either side of the roof vent frame 30 to prevent splashing of rain drops from the roof into the vent opening. As shown, tracks 22 are mounted parallel to the sides of the roof vent frame, but displaced to the end of the frame which would be the down wind end when the vehicle is in motion.

Figure 8:
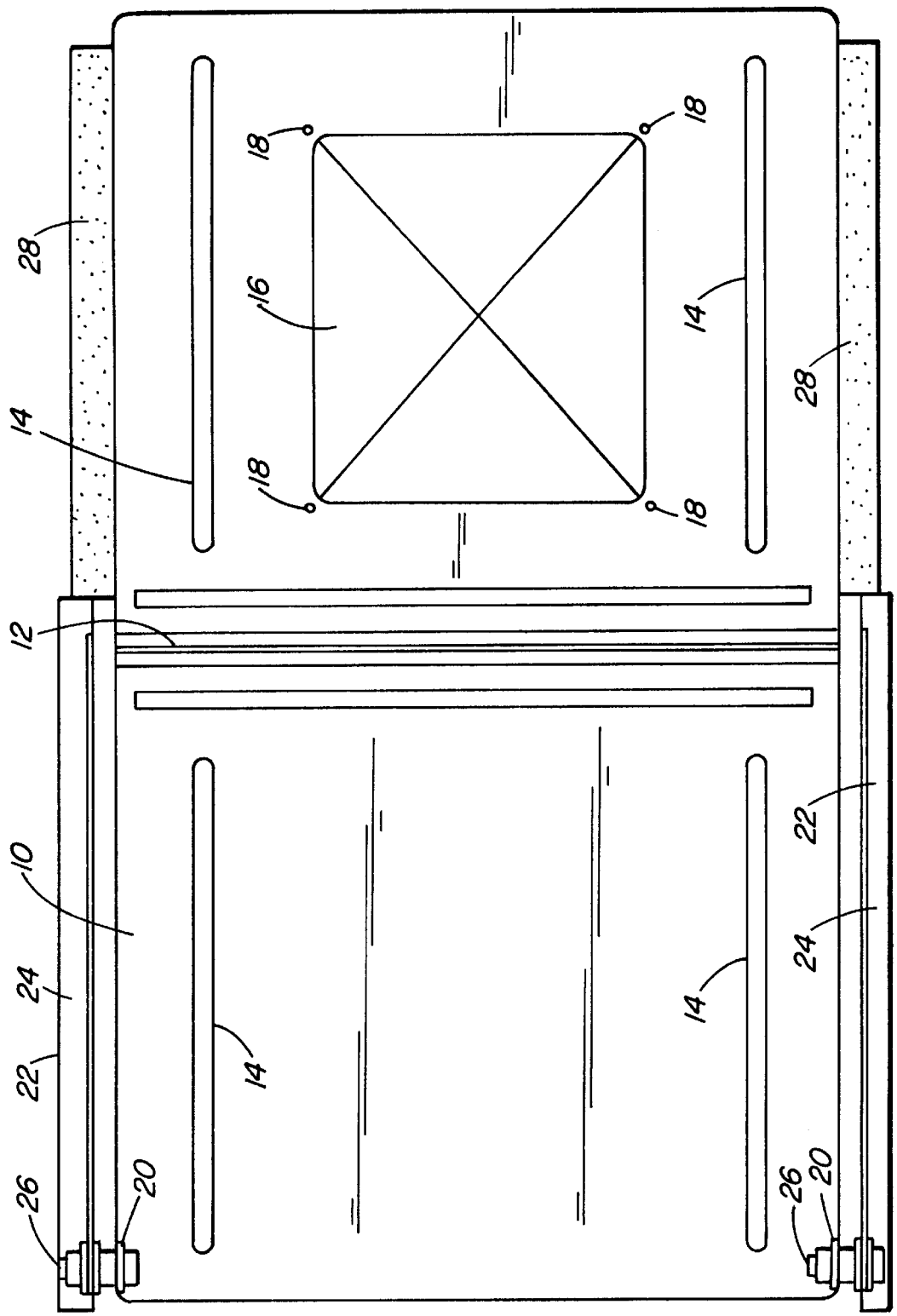
FIG. 8 is a top view of the device installed on a roof vent hatch, in the closed position.

FIG. 8 is a plan view of the deflector of the present invention in closed position, and mounted on the roof of a vehicle over the roof vent. The tracks 22 are fastened directly to the vehicle roof 36 with the sliding axle assemblies 26 engaged in the slots of the tracks 22 and with the domed section 16 of the deflector secured to the vent cap by fastenings (not shown) passing through mounting holes 18 and connected to the vent cap. The splash arresting mat sections 28 are partially visible extending beyond the edges of the deflector.

Figure 9:
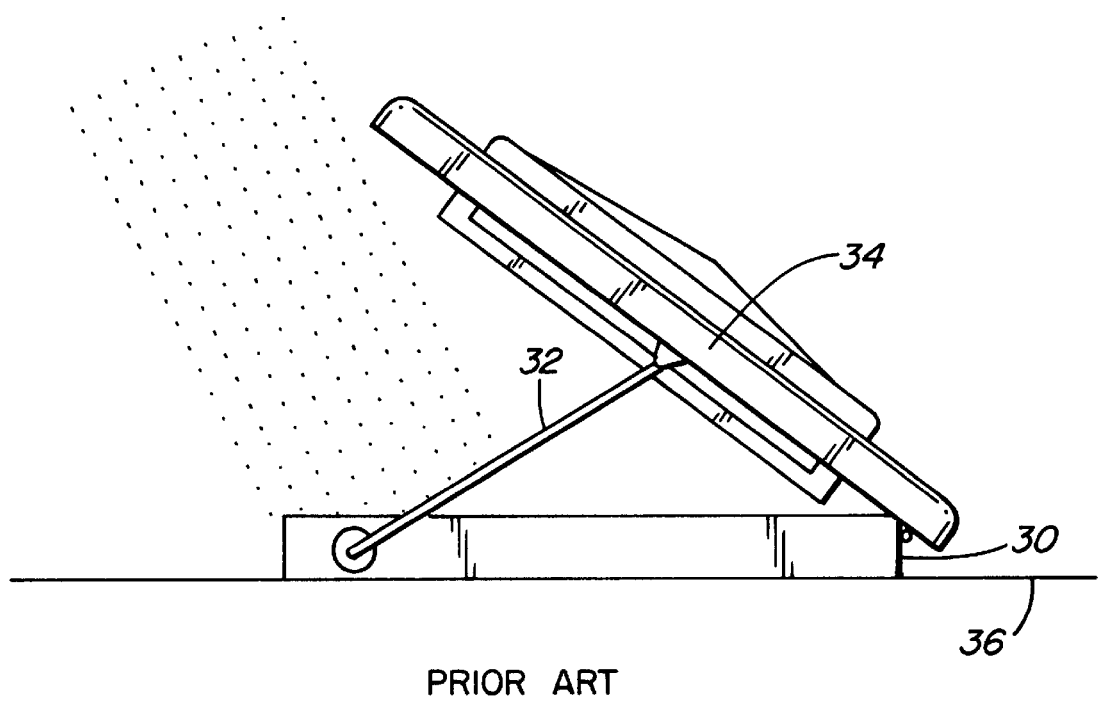
FIG. 9 is a side view of a well known roof vent used on most recreation vehicles partially open, and showing how easily rain may enter the vent. This illustrates type of unit that the deflector is intended to protect.

FIG. 9 illustrates the prior art situation where no protection is provided to prevent rain from entering the roof vent, highlighting the risk of such a vent admitting rain.

Thus the rain deflector of the present invention serves to keep rain from entering an open roof vent while permitting full ventilation through the vent.

I claim:

1. A roof vent rain deflector for co-operating with a standard vehicle hinged roof vent cap, said roof vent cap being hinged at a forward edge, thereof and having side edges and a rear edge, said deflector adapted to overlie and be coupled to said cap to prevent rain from entering the vent when the cap is raised, said deflector comprising;

a first panel having a forward edge, a rear edge, and side edges, adapted to be attached to and entirely overlie said cap and extend beyond each side edge of said cap for a distance of approximately one half the width of said cap, a second panel of substantially the same size as said first panel having a forward edge hinged to said first panel at the rear edge of said first panel and having a rear edge, track means adapted to be fastened to the roof of a vehicle equipped with said roof vent, and positioned to provide a sliding connection to the rear edge of said second panel, and means connecting said second panel in sliding relation to said track means, whereby when said cap is opened, said first panel is moved with said cap, and the forward edge of said second panel which is hinged to said first panel moves upwardly, and the rear edge of said second panel moves along said track means, said first and second panels are capable of forming a pair of triangular openings on either side of said vent cap, permitting flow of air from said vent while preventing rain from entering therein.

2. A rain deflector as claimed in claim 1, wherein said first and second panels and said hinge are formed from a single sheet of thermoplastic material.

3. A rain deflector as claimed in claim 2, wherein said tracks are formed of metal, and are provided with a longitudinally extending slot in each track, and a sliding axle assembly is connected to each side of said second panel and slides in said slot in said track.

4. A rain deflector as claimed in claims 1, 2 or 3 including splash matting adapted to be positioned on either side of said roof vent to prevent rain from bouncing on said roof and into said vent.

5. A roof vent rain deflector in combination with a standard vehicle hinged roof vent cap mounted to a roof of a vehicle to selectively close a roof vent therein, said roof vent cap having a forward edge hingedly coupled to the roof, and having side edges and a rear edge, said deflector overlying and coupled to said cap to prevent rain from entering the roof vent when the cap is raised, said deflector comprising;

a first panel having a forward edge, a rear edge, and side edges, attached to and entirely overlying said cap and extend beyond the side edges of said cap for a distance of approximately one half the width of said cap, a second panel of substantially the same size as said first panel having a forward edge hinged to said first panel at the rear edge of said first panel and having a rear edge, tracks fastened to the roof of the vehicle and positioned to provide a sliding connection to the rear edge of said second panel, and means connecting said second panel in sliding relation to said tracks, whereby when said cap is opened, said first panel is moved with said cap, and the forward edge of said second panel which is hinged to said first panel moves upwardly, and the rear edge of said second panel moves along said tracks, said first and second panels forming a pair of triangular openings on either side of said vent cap, permitting flow of air from said vent while preventing rain from entering therein.

6. The combination of claim 5, wherein said first and second panels and said hinge are formed from a single sheet of thermoplastic material.

7. The combination claimed in claim 5, wherein said tracks are formed of metal, and are provided with a longitudinally extending slot in each track, and a sliding axle assembly is connected to each side of said second panel adjacent the rear edge thereof and slides in said slot in said track.

8. The combination claimed in claim 5, 6, or 7 including splash matting adapted to be positioned on either side of said roof vent to prevent rain from bouncing on said roof and into said vent.

\* \* \* \* \*